United States Patent [19]
Cracknell et al.

[11] 3,819,532
[45] June 25, 1974

[54] GRAPHITE PELLETS
[75] Inventors: John Roland Cracknell, Esher; Aleksander Jerzy Groszek, London, both of England
[73] Assignee: The British Petroleum Company Limited, London, England
[22] Filed: Dec. 14, 1970
[21] Appl. No.: 98,029

[30] Foreign Application Priority Data
Dec. 19, 1969  Great Britain ................... 61922/69

[52] U.S. Cl. .................. 252/447, 208/307, 208/310
[51] Int. Cl. ............................................ C10g 25/00
[58] Field of Search .................. 208/307, 299, 310; 252/447

[56] References Cited
UNITED STATES PATENTS
| | | |
|---|---|---|
| 2,573,726 | 11/1951 | Porter et al. ..................... 252/447 X |
| 2,628,933 | 2/1953 | Eagle et al. .......................... 208/310 |
| 2,767,131 | 10/1956 | Jezl et al. ......................... 208/310 X |
| 2,807,655 | 9/1957 | Pitwell ............................. 252/447 X |
| 3,135,696 | 6/1964 | Ruelle et al. ..................... 252/447 X |
| 3,205,179 | 9/1965 | Soderquist et al. ................... 252/447 |
| 3,223,748 | 12/1965 | Bohrer ............................ 208/310 X |
| 3,338,815 | 8/1967 | Groszek .......................... 208/310 X |

Primary Examiner—Patrick P. Garvin
Attorney, Agent, or Firm—Morgan, Finnegan, Durham & Pine

[57] ABSTRACT

Air or gas ground graphite is formed into pellets by mixing with finely divided alumina, forming into a paste and then granulating or extruding. The pellets so formed can be used as air or gas ground graphite but with the advantage that the pellets can be in the form of a fixed bed. A typical application is a polishing treatment for lubricating oils to remove aromatics, heterocyclics, sulphur compounds and coloured materials.

3 Claims, No Drawings

GRAPHITE PELLETS

This invention relates to pellets of a carbon product having a large surface and the use of the pellets in the separation of hydrocarbons.

Finely ground graphites prepared by grinding in vacuum or in a gas, e.g., air are well known, and in this specification are termed vacuum ground or "gas-ground graphites." It is also known that finely ground graphites have selective absorption properties e.g. British Patent No. 1,126,482 discloses a method of separating long-chain normal hydrocarbons having at least 10 carbon atoms per molecule from their mixtures with other hydrocarbons by contacting the mixture with graphite having a surface area of at least $50m^2/gm$, to absorb selectively the normal hydrocarbons.

However gas or vacuum ground graphites suffer from the disadvantage that finely ground graphite can only be used in the form of a slurry.

It has now been found that the graphite can be formed into pellets by compounding with a binder. The pellets can be used in the form of a fixed bed and have the further advantage in that a counter-current process can be used.

Thus according to the present invention there is provided a composition of matter comprising graphite in the form of pellets with a binder comprising finely divided alumina said graphite being a vacuum or gas ground graphite having a surface area of 50 to 2,000 $m^2/gm$ (BET).

By the term "finely-divided alumina" we mean alumina having a surface area in the range 1 to 1,000 $m^2/gm$.

The term "alumina" is intended to embrace both hydrated alumina and anhydrous alumina.

Preferably the alumina has a surface area in the range 100 to 600 $m^2/gm$.

The finely divided alumina is preferably (i) a colloidal alumina manufactured by Du Pont and sold under the name "Baymal" and having a surface area of 350 $m^2/gm$, this material is a micro-crystalline fibrous boehmite and is α-alumina monohydrate or (ii) a colloidal alumina manufactured by Laporte and described as "Dispersible alumina" and designated RD 12026. The preparation of the "Baymal" alumina is described in U.S. Pat. No. 2,915,475.

The U.S. Pat. No. 2,915,475 discloses the preparation of fibrous Boehmite (α-alumina monohydrate) and describes the alumina as being in the form of small fibrils (the word "fibril" meaning an individual crystalline particle) in the shape of laths, at least two of the dimensions of which are in the colloidal range. The laths have their two smaller dimensions in the range 3 to 15 nanometers whilst their axial ratio, their ratio between their length and smaller dimensions, falls in the range 50:1 to 150:1. "Baymal" which has a surface area of about 350 $m^2/gm$ would have fibrils having their small dimensions at about 4 nanometers and lengths of between 200 and 600 nanometers. Depending on the conditions of manufacture the fibrils may agglomerate to give thread like aggregates called fibres which may show only partial colloidal properties.

The pellets may contain from 5 to 50 percent by weight of alumina binder preferably 15 to 40 percent wt., and from 95 to 50 percent by weight of graphite, preferably 85 to 60 percent wt.

According to another aspect of the present invention there is provided a process for the preparation of graphite-containing pellets which process comprises intimately mixing a vacuum or gas-ground graphite powder having a surface are of 50 to 2,000 $m^2/gm$ with a finely divided alumina binder, working the mixture into a paste with a suitable liquid and granulating or extruding through a die.

The graphite and the alumina can be mixed either wet or dry. In dry mixing satisfactory results have been obtained by ball milling but high speed mixing in, e.g., a Universal High Speed mixer Type TLEHK - 8 made by Gunter Papenmeier A.G. is preferred. In wet mixing it is preferred to mix using a High Speed Mixer or a colloid mill e.g. a colloid mill made by Premier Colloid Mills Ltd. using a gap of $1.016 \times 10^{-4}$ m between the stones. The granulation can be effected by spreading the paste out on a tray, allowing to dry and breaking up the cake so formed.

After extrusion or granulation the extrudate or granules are preferably dried, broken up and sintered in nitrogen for 24 hours at 400°C.

The extruded pellets thus prepared are mechanically strong and stable in hydrocarbon solvents such as toluene, n-heptane and iso-octane.

The graphite used to prepare the pellets is preferably ground graphite prepared by ball milling graphite in vacuum or a gas, e.g., air.

The grinding of the graphite gives small particles with a plate like graphite structure. Most of the surface area is contributed by the basal planes of the plates, but there is also a significant contribution made by the edges. For air ground graphite the ratio of basal plane surface area to edge surface area in a typical instance is about 4.5:1.

As previously described the graphites thus produced have the capability of absorbing normal hydrocarbons on the basal plane surface area and polar compounds, e.g., aromatics, sulphur and nitrogen compounds on the edge surface area. By adjustment of the feedstock and process conditions as described hereunder, the selectivity for either type of compound can be varied.

Thus according to another aspect of the present invention a process for the separation of normal hydrocarbons and/or polar compounds from their mixtures with other hydrocarbons comprises contacting the mixture with graphite pellets as hereinbefore defined to selectively adsorb said normal hydrocarbons and/or polar compounds.

The graphites before compounding with the binder preferably have a surface area of at least 50 square metres per gram and more preferably have a surface area of at least 300 square metres per gram.

The feed mixture for the process may be a petroleum distillate or residue boiling above 30°C, particularly a fraction in the waxy distillate boiling range i.e. 300° to 700°C or a waxy raffinate or a dewaxed raffinate. The feed may be a straight run fraction or a waxy raffinate obtained after a selective solvent treatment with, e.g., furfural to remove aromatics. The feed may also be a solvent treated dewaxed lubricating oil fraction or hydrocracked gas oil the treatment in this case being a finishing treatment to improve colour and oxidation stability.

The process can also be used for removing polynuclear aromatic compounds, e.g., 3,4, benzo pyrene from lubricating oils and waxy distillates.

The absorption and desorption stages of the process of the invention are preferably carried out in the presence of liquids in which the adsorbed and subsequently desorbed components are soluble. These liquids may be the same or different. Thus, the liquid may comprise a single paraffin hydrocarbon, such as n-heptane or iso-octane, or it may comprise a mixture of hydrocarbons including refinery streams such as Primary Flash Distillate or an aromatic or alcoholic solvent may be used. The solvent used for dewaxing is preferably a polar solvent since such solvent promotes the absorption of non-polar compounds, such as waxes, including long chain n-paraffins. For the removal of polar compounds, the preferred solvent is a n-paraffin.

The adsorption stage of the process of the invention may be performed at a temperature of from −50°C to 200°C. If a mixture of paraffins, aromatics or alcohols is used its boiling range should be within this range. Hydrocarbons whose atmospheric boiling point is outside this range may be used at sufficient pressure to achieve a boiling point within the range quoted, provided that the description temperature is not above the critical temperature. Thus, for example, liquified propane and butane (L.P.G.) may be used under certain conditions.

For processing waxy raffinates and distillates a solvent is preferred. For a mobile liquid feedstock such as gas oil or kerosene no solvent is required.

The loading of the graphite with the absorbed components will depend on the nature of the feed, but should desirably be as low as possible. The loading expressed as graphite:feed ratio by wt is preferably less than 1:2, and more preferably less than 1:1 wt. The ratio of absorbed components to graphite may, however, be as low as 1:100. When refining waxy raffinates or distillates with dewaxing as the prime objective the overall graphite:feed ratios will usually be in the range 1:1 to 10:1. If a multistage batch treatment is being used the individual stage graphite:feed ratios may be in the range 0.5:1 to 4:1.

When applying a polishing treatment to a dewaxed raffinate with the object of removing aromatics, heterocyclics, sulphur compounds and coloured materials, the overall graphite:feed ratios may be in the range 0.5:1 to 4:1.

The feed solvent/feed ratios can vary from 0:1 and 50:1 by wt. Suitable contact times between the graphite and the feed may be from 1 minute to 24 hours. The adsorption of n-paraffins is promoted by low temperatures within the stated range, and the preferential adsorption of aromatics by higher temperatures. Thus, the temperature should not be above 100°C and preferably from 0° to 50°C if it is desired to adsorb paraffins. The temperature may be above 30°C, and preferably from 50° to 200°C where aromatics are to be adsorbed.

The adsorbed hydrocarbons may be recovered from the graphite by contacting it with a liquid which may be the same as that of the adsorption stage, or a chemically identical or different liquid may be used. The use of the same solvent is preferred.

The temperature may be in the range from room temperature up to 1,000°C and pressure may be applied to keep the material treated in the liquid phase.

Typically the temperature of desorption is in the range of 100 to 400°C.

Alternatively, certain feedstocks can be treated over the graphite alumina adsorbent in the gas phase.

The pressure at which desorption is carried out should be such as to maintain the eluting material in the liquid state and will accordingly be within the range 10 to 3,000 psig. It will of course be determined by the vapour pressure of the eluting material at the desorption temperature. The contact time will be within the range 1 to 120 minutes. The solvent desorbate ratio is preferably from 11:1 to 100:1.

The method is desirably carried out in a cyclic type of operation, for example, by percolating the feed mixture together with liquid through a bed of graphite pellets, removing non-adsorbed feed material and liquid from the bed stripping the liquid from the non-adsorbed feed material, desorbing the adsorbed material from the graphite with the liquid, removing the desorbed material and liquid from the bed, stripping liquid from the desorbed material, and re-contacting the graphite with the feed mixture. In such a fixed bed type of operation reaction conditions, in particular liquid flow rate, should be chosen so that the pressure drop across the bed is not excessive.

In the case of preparation of lubricating oil basestocks, the feedstock may be treated by any number of adsorption/desorption cycles to give a desired pour-point and viscosity index. The pour point of the treated material will decrease as the extent of removal of adsorbed materials increases, but the yield will also decrease. Waxy raffinate fractions treated by the process of the invention have in general higher viscosity indexes, lower cloud and pour points and lower sulphur contents than fractions obtained by conventionally treating similar feedstocks. They also have better response to oxidation inhibitors. In addition to the oil products obtained, the absorbed and subsequently desorbed material, i.e., normal paraffins and/or aromatics may be of use, particularly if it is waxy paraffinic or aromatic hydrocarbon material.

The invention is illustrated by the following examples.

EXAMPLE 1

A Kuwait waxy distillate having a pour point of 38°C

| viscosity at 38°C = 220 | centistokes | viscosity index = 67 |
|---|---|---|
| 60°C = 64.34 | do. | sulphur = 3.18% wt |
| 77°C = 31.57 | do. | |
| 99°C = 15.09 | do. | | was mixed with the pelletted graphite and iso-octane under the following conditions:

| Loading by wt | 5:1 (pellets:distillate) |
|---|---|
| Solvent | iso-octane at 20 ml per g feedstock |
| Temperature | ambient |
| Contact time | 24 hr. |

The graphite pellets were prepared by mixing 75 gms of graphite obtained from Solid Lubricants Limited prepared by grinding in air in a cascade ball mill to a surface area of 375m$^2$/gm (B.E.T.) with 25 gms of Baymal alumina and then milling the dry solids for 10 minutes. The mixture was then worked into a thick paste by adding water and extruded through a 3.175 × 10$^{-3}$M die. The extrudate was dried in air, broken up into pellets of size one-eighth inch diameter and sintered in nitrogen for 24 hours at 400°C to yield pellets if size one-eighth inch diameter. The treated distillate (obtained in 55 percent wt yield) was separated from the pellets by filtration and removal of solvent and had the following properties:

| | | |
|---|---|---|
| Viscosity at 38°C | 164.52 c St | (220) |
| 60°C | 52.06 | (64.34) |
| 99°C | 13.42 | (15.09) |
| Viscosity index | 80 | (67) |
| Pour point (micro) | +4°C | (+38°C) |

Figures in brackets refer to the original distillate.

EXAMPLE 2

A finished Kuwait/I meg lubricating oil having a viscosity of 110 contistokes at 100°F and a viscosity index of 95 determined in accordance with ASTM D 2270 was percolated through a bed of 14-100 BSS graphite alumina crushed extrudate under the following conditions:

| | |
|---|---|
| Solvent | iso-octane at 3 ml per g feedstock |
| Temperature | ambient |
| Space velocity | 0.365 vol/vol/hour contact time 2.74 hours |
| wt of adsorbent | 977 g length of bed 45 cms. |

The graphite alumina adsorbent was prepared by mixing 3 parts by weight of graphite obtained from Solid Lubricants Limited and prepared by grinding in air in a cascade ball mill to a surface area of 375 m²/gm (BET) with 1 part of Baymal alumina and then ball milling the dry solids for 10 minutes. The mixture was then worked into a thick paste and extruded through a 3.175 × 10⁻³M die. The extrudate was dried in air, sintered in nitrogen at 400°C for 24 h and crushed and sieved to yield 14-100 mesh BSS adsorbent.

The treated oil was collected in 9 fractions having the properties shown in Table 1.

The results show that treatment with the graphite pellets improves the colour stability of the lubricating oil and removes aromatics, sulphur and nitrogen compounds.

Overall Yield of unadsorbed oil 97 percent
Overall graphite:feed oil ratio 0.0821:1

Table 1

| Fraction | Yield g | Micro Pour Point °F | ASTM Colour | Sulphur Content % wt | Total Nitrogen ppm | Aromatic Carbon $C_A$ % |
|---|---|---|---|---|---|---|
| 1 | 405.6 | 5 | <0.5 | 0.67 | 9 | 2.6 |
| 2 | 1029.0 | 10 | <1.0 | 0.97 | 31 | 3.5 |
| 3 | 1016.5 | 10 | 1.5 | 1.03 | 66 | 3.4 |
| 4 | 979.4 | | <1.5 | 1.04 | 85 | 3.8 |
| 5 | 1014.0 | | 1.5 | 1.03 | 100 | 4.2 |
| 6 | 624.0 | | 1.5 | 1.04 | 105 | 3.8 |
| 7 | 1277.0 | | <2.0 | 1.04 | 110 | 3.6 |
| 8 | 944.0 | | <2.0 | 1.06 | 110 | 3.7 |
| 9 | 1343.0 | | 2.0 | 1.06 | 115 | 3.6 |
| Feed | — | 10 | 2.5 | 1.06 | 125 | 3.6 |

After passing the oil, the column was washed with iso-octane at 250°C and 274 g of waxes and aromatics recovered. After the desorption the feedstock was percolated again and 2 fractions collected comprising a total of 1,855 g as shown in Table 2.

Table 2

Second Run

| Fraction No. | Cumulative wt g | Oil to Graphite Ratio | ASTM Colour | S % | N ppm | $C_A$ |
|---|---|---|---|---|---|---|
| 1 | 545 | 0.61:1 | <1.0 | — | 24 | — |
| 2 | 1855 | 1.9:. | — | — | 66 | — |

EXAMPLE 3

EXTRACTION OF POLYNUCLEAR COMPOUNDS BY GRAPHITE/ALUMINA

The pellets were prepared exactly as in Example 2 but alumina manufactured by Laporte having a surface area of 2m²/gm was used in place of Baymal Alumina. The pellets were the same size as in Example 2 viz 4-100 mesh B.S.S.

| | Oil | Total UV Absorbance 280–400 mu + | 3,4-Benzopyrene Ug/kg × |
|---|---|---|---|
| (a) | A middle East waxy distillate. | 32.0 | 750 |
| | The procedure of Example 2 was repeated but, 5 parts by weight of oil treated with 1 part of graphite/alumina at 50°C with-solvent | 9.1 | 30 |
| (b) | Feed oil | 9.4 | 150 |
| | As in (a) above, 5 parts of oil treated with 1 part of graphite/alumina at 50°C without solvent | 6.2 | 20 |
| | As above, 1:1 treatment with graphite/alumina at 20°C in isooctane | 0.6 | <10 |
| (c) | SAE 10 lubricating oil prepared by hydrogeneration of a Kuwait vacuum distillate | 2.7 | 100 |
| | As in (a) and (b) above 5 parts of oil treated with 1 part of graphite/alumina at 50°C no solvent | 0.1 | <10 |

× determined by liquid chromatography and UV spectroscopy.
+ determined by FDA 121.2589 (c).

The oil used in Example 3 (a) has the following inspection data:

| | | | |
|---|---|---|---|
| Kinematic viscosity at | 100°F | 20.5 | centistokes |
| | 140°F | 9.6 | do. |
| | 210°F | 3.86 | do. |
| Specific Gravity 60/60 | 0.901 | | |

The oil used in Example 3 (b) gave the following Vacuum Engler distillation data.

| | | |
|---|---|---|
| Initial listing point | 343 | |
| 10% distilled | 383 | |
| 50% distilled | 414 | |
| 90% distilled | 450 | |
| Final listing point | 472 | |
| Kinematic viscosity at | 100°F | 20.5 centistokes |
| | 140°F | 9.6 centistokes |
| | 210°F | 3.86 centistokes |
| Specific Gravity 60/60 | 0.8805. | |

EXAMPLE 4

GRAPHITE TREATMENT OF A HYDROCRACKED GAS OIL

The pellets were prepared exactly as described in Example 3 and the hydrocracked gas oil, boiling range 225°C to 370°C, was percolated through graphite/alumina pellets without solvent at room temperature, the products being collected at oil to graphite ratios of 20:1 and 35:1.

The percolated oils have been found to be much lighter in colour and had a significantly greater stability to light and heat compared with the feedstock as shown in the table below.

| | | Percolated Oils | |
|---|---|---|---|
| Test | Feedstock | Oil to Graphite Ratio 20:1 | Oil to Graphite Ratio 35:1 |
| Colour, ASTM | < 3.5 | < 0.5 | < 0.5 |
| Exposure to sunlight, 1 day on window sill | light brown deposit | no deposit, oil clear | no deposit, oil clear |
| *DEF 2060 test, Method 16 (heating at 210°F for 16 hours) | | | |
| Total sediment, mg/100m | 0.23 | 0.1 | 0.06 |

* Ministry of Defence test.

These results show that 'polishing' of gas oils by percolation through graphite/alumina absorbents increases substantially their stabilities to light and heat.

EXAMPLE 5

PREPARATION OF GRAPHITE/ALUMINA ABSORBENT

The graphite, 75 grams, was mixed in a dry state with 25 grams of the alumina, which has a dispersible type GB 300 obtained from Pechiney St Gobain.

The graphite had a surface area of 380 m²/gm and the alumina 300 m²/gm.

The minimum of water, about 30 grams, was added gradually with continuous mixing to give a firm smooth paste.

The paste was extruded through one-sixteenth inch diameter die. The extrudate was allowed to dry slowly overnight and then sintered in nitrogen at 400°C.

The sintered material has the physical properties shown in Table I below:

TABLE I

| Graphite/Alumina GB 300 6 – 25 BSS mesh | | | |
|---|---|---|---|
| BET Surface Area, | m²/g | 355 | |
| Bulk Density | Maximum | 0.61 | gms/cc |
| | | 0.52 | gms/cc |

Separation of a Waxy Raffinate having a viscosity of 110 centistokes at 100°F and a viscosity index of 95 determined in accordance with ASTM D 2270 over a column of Graphite alumina absorbent. A column 89 centimetres long and 5.7 centimetres square cross section was filled with 300 grams of 6-25 BSS mesh crushed graphite/alumina extrudate.

A solution of 56.25 grams of the waxy Raffinate of Kuwait origin in 500 milli-liters of isooctane was pumped through the column at a flow rate of 200 mls per hour and a residence time time of 2 hours. The removal of fractions of the unadsorbed oil was effected by pumping isooctane through the Column. Equal volumes of solution issuing from the Column gave the following yields and pour points when the oil was isolated. The temperature of the elution was 22°C.

TABLE II

Absorbent Graphite (75%) Pechiney GB 300 alumina (25%) 6–25 BSS mesh.

| | |
|---|---|
| — weight | 300 gms |
| Eluent | isooctane |
| Flow rate | 200 mls/hr |
| Residence Time in Column | 2 hours |
| Charge Oil Kuwait Waxy Raffinate | |
| Charge Weight | 56.25 grams |
| Pour Point of Feed | 100°F |
| Wax content of feed Products. | 19.9% wt |
| Eluted with isooctane | |
| Fraction 1 weight percent | 6.2 |
| Pour point °F | −3 5 |
| Fraction 2 Weight percent | 23.5 |

TABLE II-Continued

| | | |
|---|---|---|
| Pour Point °F | | +5 |
| Fraction 3 weight percent | | 17.2 |
| Pour point °F | | +3 5 |
| Fraction 4 weight percent | | 9.8 |
| Pour point °F | | +40 |
| Fraction 5 weight percent | | 5.3 |
| Pour point °F | | +5 5 |
| Fraction 6 weight percent | | 3.9 |
| Pour point °F | | +50 |
| Fraction 7 weight percent | | 4.6 |
| Pour point °F | | 60 |
| Fraction eluted with hot Ethylene Dichloride 150°C wt% | | 14.6 |
| Pour point °F | | <100 |

We claim:

1. A composition of matter in the form of pellets consisting essentially of 95 to 50 percent wt. of a vacuum or gas ground graphite having a surface area of 50 to 2000 m$^2$/gm (BET) and, as a binder, 5 to 50 percent wt. of a finely divided alumina.

2. A composition as claimed in claim 1 wherein the alumina has a surface area of 100 to 600 m$^2$/gm.

3. A composition as claimed in claim 1 wherein the pellets have a particle size in the range 4 to 200 mesh BSS.

* * * * *